June 24, 1947.   O. A. KANGAS   2,422,909
SAFETY STARTER SWITCH
Filed Dec. 21, 1943   3 Sheets-Sheet 1

Inventor
Oscar A. Kangas
By Clarence A. O'Brien
and Harvey B. Jacobson
Attorneys

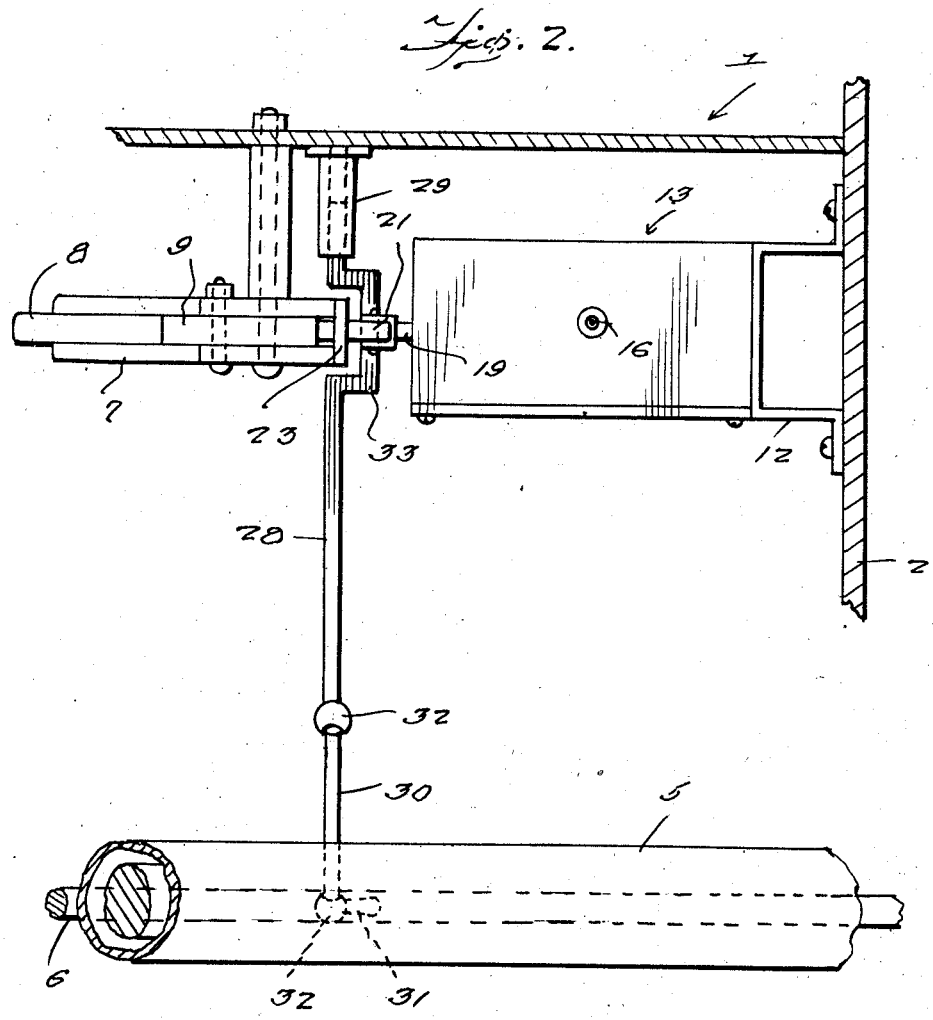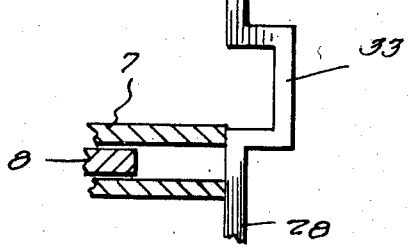

June 24, 1947.   O. A. KANGAS   2,422,909
SAFETY STARTER SWITCH
Filed Dec. 21, 1943   3 Sheets-Sheet 3

Inventor
Oscar A. Kangas
By Clarence A. O'Brien
and Harvey B. Jacobson
Attorneys Patented June 24, 1947

2,422,909

UNITED STATES PATENT OFFICE 2,422,909

SAFETY STARTER SWITCH

Oscar A. Kangas, Frazee, Minn.

Application December 21, 1943, Serial No. 515,167

6 Claims. (Cl. 192—2)

1

The present invention relates to new and useful improvements in starter switches for motor vehicles, and has for one of its important objects to provide, in a manner as hereinafter set forth, a unique construction and arrangement, whereby closing of the electric circuit to the usual starting motor for the engine will be rendered impossible while the hand brakes of the vehicle are applied.

Another very important object of the invention is to provide a safety starter switch of the aforementioned character which is operated or controlled by the hand brake lever of the vehicle.

Still another very important object of the invention is to provide novel means for positively preventing operation of the hand brake lever in a manner to close the starter switch while the transmission of the vehicle is in any position other than neutral.

Other objects of the invention are to provide a safety starter switch for motor vehicles which will be comparatively simple in construction, strong, durable, compact, highly efficient and reliable in operation, and which may be manufactured and installed at low cost.

All of the foregoing, and still further objects and advantages of the invention will become apparent from a study of the following specification, taken in connection with the accompanying drawings, wherein like characters of reference designate corresponding parts throughout the several views, and wherein:

Figure 2 is a top plan view of the device.

Figures 4 and 5 are fragmentary views in horizontal section through the hand brake lever showing, in top plan, the locking bar for said lever in its two operative positions.

Figure 1:
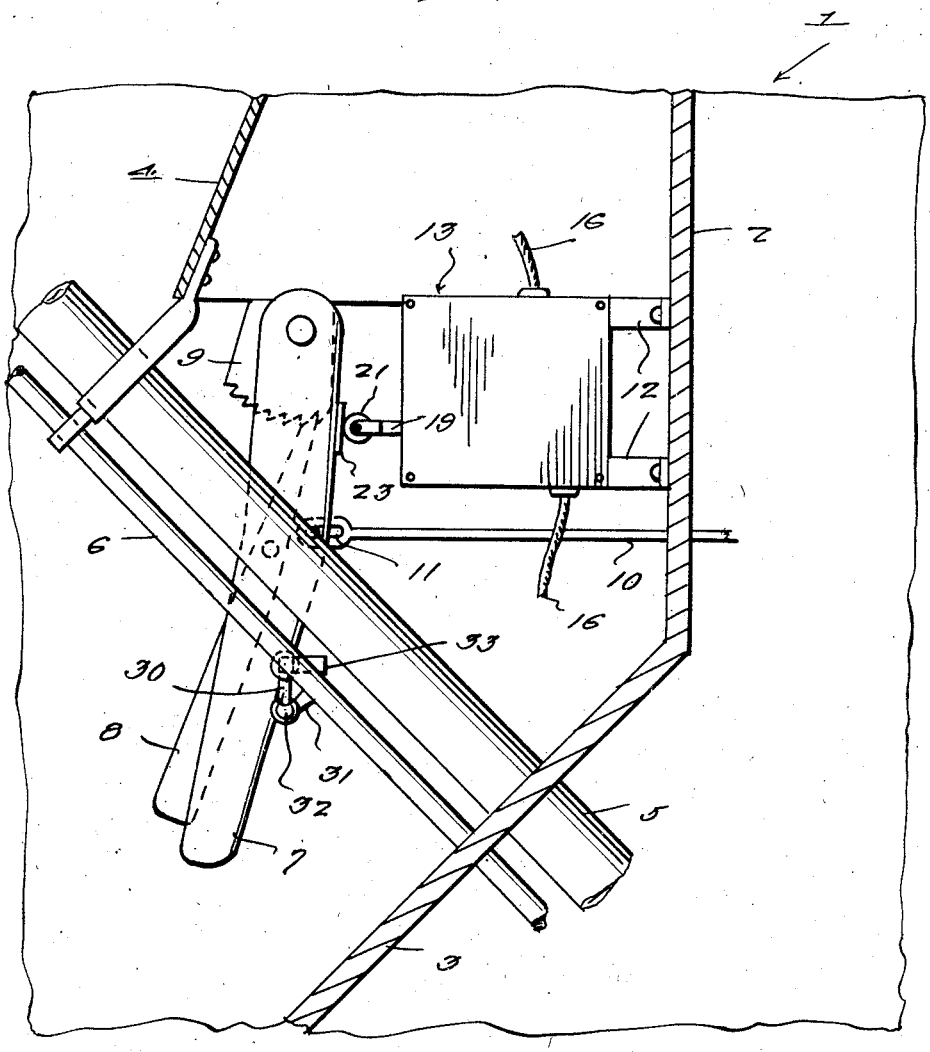
Figure 1 is a view in side elevation of the invention, showing portions of the motor vehicle in vertical section.

Referring now to the drawings in detail, it will be seen that reference character 1 designates generally a portion of a motor vehicle. The motor vehicle 1 includes the usual dashboard 2, the toeboard 3 and an instrument panel 4. Reference character 5 designates the steering column of the vehicle having mounted thereon the transmission operating shaft 6.

Pivotally suspended beneath the instrument panel 4 of the vehicle is a hand brake lever 7. A pawl 8 is pivotally mounted on the lever 7 and engageable with a toothed segment 9 for releasably securing said lever in operative or brake-

2 applying position in the usual manner. The brake-operating rod or cable 10 is coupled to the lever 7 by a pin and slot connection 11.

In the embodiment of the invention which has been illustrated, brackets 12 are mounted on the dashboard 2 of the vehicle forwardly of the lever 7. Mounted on the brackets 12 is a housing 13 of suitable dimensions and material. The housing 13 is also located forwardly of the hand lever 7.

Figure 3:
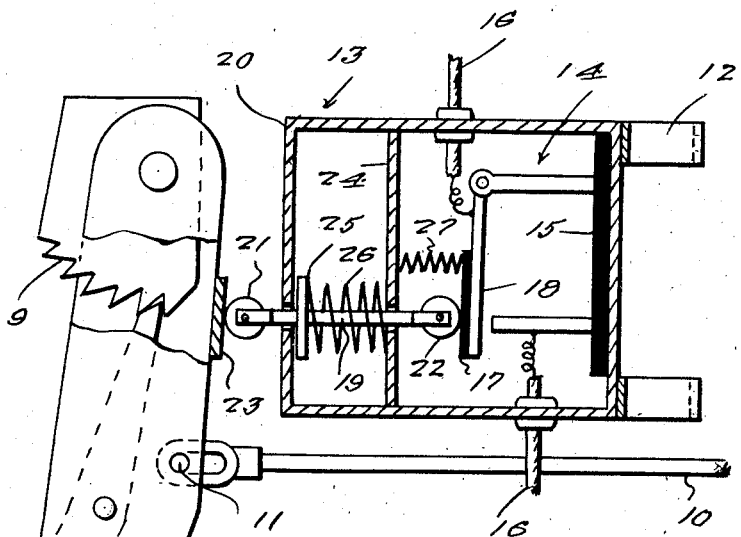
Figure 3 is a view in vertical longitudinal section through the switch, showing the hand brake lever with a portion broken away.

As illustrated to advantage in Figure 3 of the drawings, a switch 14 of the pivoted blade type is mounted in the forward portion of the housing 13 and insulated therefrom, as at 15. The switch 14 is interposed in the electric circuit to the starting motor of the vehicle. Conductor wires 16 enter the housing 13 and are electrically connected to the opposite sides of the switch 14. An insulating element 17 is mounted on the pivoted blade 18 of the switch 14.

Extending slidably into the housing 13 through the rear end 20 thereof is a rod 19. Rollers 21 and 22 are journaled on the end portions of the slidable rod 19. Roller 21 is engaged with a plate 23 on the hand brake lever 7. The roller 22 is engaged with the insulating element 17 on the switch blade 18.

The rod 19 is slidable through a guide 24 in the housing 13. Fixed on the rod 19 is a collar 25. A coil spring 26 has one end engaged with the guide 24 and its other end engaged with the collar 25 for urging the rod 19 rearwardly away from the switch 14. The coil spring 26 encircles the rod 19. The collar 25 also functions as a stop which is engageable with the rear end 20 of the housing 13 for limiting the sliding movement of said rod under the influence of the spring 26. A pull spring 27 is connected to the blade 18 for opening the switch 14.

Extending transversely adjacent the front of the hand lever 7 is a locking bar 28 for said hand lever. The locking bar 28 is slidably supported in the vehicle in any suitable manner, as at 29. A link 30 connects one end of the locking bar 28 to an arm 31 on the transmission shaft 6 of the vehicle. Universal joints 32 connect the link 30 to the locking bar 28 and to the arm 31. The locking bar 28 includes a substantially U-shaped portion 33 for the reception of the hand lever 7 when the transmission of the vehicle is in neutral.

Figure 4:
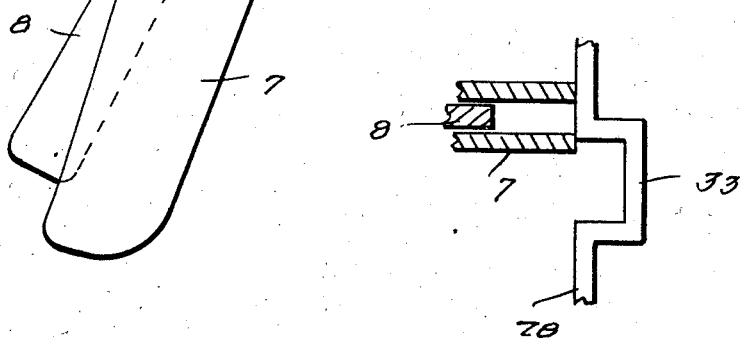

It is thought that the operation of the apparatus will be readily apparent from a consideration of the foregoing. Briefly, with the hand brake lever 7 of the vehicle in neutral or off position, the switch 14 is open, as seen in Figure 3 of the drawings. If the transmission of the vehicle is in any position other than neutral, the slidable locking bar 28 is in either of the operative positions shown in Figures 4 and 5 of the drawings. It will thus be seen that it will be impossible to close the starter switch 14 unless the transmission is in neutral and the hand brakes of the vehicle have been released. When the transmission is in neutral, the portion 33 of the locking bar 28 is opposed to the hand lever 7 for the reception thereof. Now, to close the switch 14, the hand brake lever 7 is swung forwardly from its neutral or off position. Sufficient forward movement of the hand lever 7 in this manner independently of the brake rod or cable 10 is permitted by the pin and slot connection 11. When the lever 7 is swung forwardly, the rod 19 is actuated thereby against the tension of the spring 26 for closing the blade 18 of the switch 14 against the tension of the spring 27. When it is desired to again open the switch 14, the hand lever 7 is released and said hand lever is returned to its neutral or operative position, as seen in Figure 3 of the drawings by the spring 26 through the rod 19. When this occurs, the spring 27 pulls the blade 18 to open position.

It is believed that the many advantages of a safety starter switch constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. In combination with the hand brake lever and variable speed transmission operating means of a motor vehicle, a starter switch operatively connected to the lever for actuation to closed position thereby, and means operable by the transmission operating means for blocking the lever for preventing closing of the starter switch when said transmission is in any of its speeds.

2. In combination with the hand brake lever and the variable speed transmission operating means of a motor vehicle, a starter switch, means operatively connecting the lever to the starter switch for closing same when said lever is swung beyond brake-releasing position, and means operable by the transmission operating means for blocking the lever against swinging movement beyond brake-releasing position when the transmission is in any position other than neutral.

3. In combination with the hand brake lever of a motor vehicle, a housing, a switch mounted in said housing and interposed in the electric circuit to the starting motor of the vehicle, said switch including a pivoted blade, a rod slidable in the housing, a roller on one end of the rod engaged with the lever, said rod being operable in one direction by said lever, a roller on the other end of the rod engaged with the blade for closing the switch when the hand lever is swung beyond brake-releasing position, a return spring operatively connected to the rod for actuating the lever in the opposite direction, and a spring connected to the blade for opening same.

4. In a motor vehicle including a hand brake lever and a variable speed transmission operating mechanism, a starter switch operable to closed position by the lever when said lever is swung beyond brake-releasing position, and a bar operatively connected to the transmission operating mechanism, and disposed in the path of travel of the lever, for preventing operation of the lever for closing the switch when the transmission is in any position other than neutral, said bar including a substantially U-shaped portion for the reception of the lever for releasing said lever for closing the switch when the transmission is in neutral position.

5. In combination with the hand brake lever of a motor vehicle, a starting switch, a housing enclosing said switch, operating means for said switch extending through said housing and into the path of travel of said lever, and means on said lever for engaging said operating means to close the starter switch upon movement of the lever to a position beyond the brake releasing position.

6. In combination with the hand brake lever and the variable speed transmission operating means of a motor vehicle, a starter switch, means operatively connecting the lever to the starter switch for closing same when said lever is swung beyond brake releasing position, and means operable by the transmission operating means for blocking the lever against swinging movement beyond brake releasing position when the transmission is in any position other than neutral, said last mentioned means comprising a bar slidable across the path of travel of said lever and provided with an axially offset portion slidable before said lever to unblock the same and with a blocking portion adjacent said offset portion.

OSCAR A. KANGAS.

REFERENCES CITED

The following references are of record in the file of this patent:

UNITED STATES PATENTS

| Number | Name | Date |
| --- | --- | --- |
| 1,673,206 | Safely | June 12, 1928 |
| 1,859,328 | Cobb, Sr. | May 24, 1932 |
| 2,234,607 | Riedmaier | Mar. 11, 1941 |
| 2,241,677 | Sheldrick | May 13, 1941 |
| 2,274,990 | Mildebrath | Mar. 3, 1942 |